United States Patent [19]

Nishimura

[11] Patent Number: 4,651,291

[45] Date of Patent: Mar. 17, 1987

[54] METHOD OF INDICATING MEASURED VALUES OF MEASURING INSTRUMENT

[75] Inventor: Takeji Nishimura, Kawasaki, Japan

[73] Assignee: Mitutoyo Mfg. Co., Ltd., Tokyo, Japan

[21] Appl. No.: 573,431

[22] Filed: Jan. 24, 1984

[30] Foreign Application Priority Data

Jan. 26, 1983 [JP] Japan .................................. 58-10835

[51] Int. Cl.⁴ .......................... G01B 5/08; G06F 15/36
[52] U.S. Cl. ..................................... 364/560; 364/550; 364/709
[58] Field of Search ................................ 364/560–563, 364/709, 550, 551, 554, 188; 340/870.09; 33/1 BB, 1 S

[56] References Cited

U.S. PATENT DOCUMENTS

| | | | |
|---|---|---|---|
| Re. 31,750 | 11/1984 | Morrow | 364/550 X |
| 4,048,484 | 9/1977 | Brittan | 364/554 |
| 4,161,781 | 7/1979 | Hildebrandt et al. | 364/562 |
| 4,181,959 | 1/1980 | Tateishi | 364/562 |
| 4,270,173 | 5/1981 | Suttler | 364/560 X |
| 4,296,474 | 10/1981 | Hurt | 364/560 |
| 4,356,556 | 10/1982 | Sterki | 364/560 |
| 4,400,783 | 8/1983 | Locke, Jr. et al. | 364/550 |
| 4,519,026 | 5/1985 | Nozawa et al. | 364/188 X |

Primary Examiner—Felix D. Gruber
Assistant Examiner—Joseph L. Dixon
Attorney, Agent, or Firm—Flynn, Thiel, Boutell & Tanis

[57] ABSTRACT

A method for indicating measured value data of a measuring instrument, in which the measured value data of a workpiece to be measured is measured by a measuring instrument, such as slide calipers and the data indicated histogrammatically. There are present divided sections obtained by evenly dividing a set range of a measured value by a divisor, judging which divided section each of the measured value data, which has been successively taken in, belongs to, and storing the frequencies of measurement of the measured value data. The frequencies of measurement thus stored are divided by a predetermined weight coefficient to obtain a quotient, and the aforesaid divided sections are printed histogrammatically as marks representing minimum integers larger in value than the quotient, with the maximum value of variability having a value suitable for being received in the maximum indication places, so that the mean value, variability and the like of the measured values can be readily recognized.

8 Claims, 7 Drawing Figures

METHOD OF INDICATING MEASURED VALUES OF MEASURING INSTRUMENT

BACKGROUND OF THE INVENTION

1. Field of the Invention

This invention relates to a method of indicating measured values of a measuring instrument.

2. Description of the Prior Art

There has heretofore been known a measuring instrument, in which a photoelectric or electromagnetic type encoder is connected to a so-called contact type measuring instrument for measuring a dimension of a workpiece to be measured from a displacement value in a micrometer, slide calipers, dial gauge or the like, to thereby read a dimension of the workpiece with high accuracy. The measuring instrument of the type described has been widely utilized in many fields because a measured result, being digitally indicated, can be read at a glance and there is no individual difference in reading the measured result.

However, the measuring instrument of the type described, merely indicating the specific measured value of the workpiece or recording the same, is inconvenient in the exercise of quality control. For example, the maximum value and the minimum value can be comparatively easily judged, however, the mean value, the standard deviation and the like must be separately processed by an electronic computer. However, in the practical measuring works, there are many cases where it is difficult to process everything as described above, but, it is not absolutely necessary to do so.

SUMMARY OF THE INVENTION

The present invention has been developed on the basis of the practical measuring works as described above and has as its object the provision of a method for indicating a group of measured value data of a measuring instrument histogrammatically and qualitatively.

To this end, the present invention contemplates, in a method for indicating a group of measured values by use of a measuring instrument, bringing of the a measuring element into contact with a workpiece to be measured, obtaining a displacement value of the measuring element in the form of an electric signal by use of an encoder connected to the measuring element and a measured value based on this electric signal, indicating the measured value in an output device having a predetermined number of indication places(n), storing the upper limit value (Max) and the lower limit value (Min) of a set dimension based on a reference value of the workpiece, a divisor (Nd) evenly dividing a range of the set dimension, and weight coefficients (C) comprising a plurality of integers, thereafter, each time that a measured value data (Di) is detected, when the measuring element comes into contact with the workpiece, it is judged which divided section of the set dimension evenly divided by the divisor (Nd) each of the measured value data (Di) belongs to, the frequencies of measurement (Fj) of the measured value data (Di) belonging to each of the divided sections are stored, when a number (i) of the measured value data (Di) reaches an optional sampling number (N), by a command of the worker, or, in the case where the sampling number is set, when the number (i) of the measured value data (Di) reaches a predetermined sampling number, the maximum measurement frequency (Fmax) out of the respective frequencies of measurement (Fj) is sought, this maximum measurement frequency (Fmax) is divided by the number of indication places (n) and a quotient (Fs) is extracted, the minimum weight coefficient (Cn) is selected out of the weight coefficients (C) which are larger in value than the aforesaid quotient (Fs), the respective frequencies of measurement (Fj) are divided by the weight coefficient (Cn) thus selected to obtain a quotient (Qj), thereafter, the minimum integers (Nj) which are larger in value than the respective quotient (Qj) are determined, respectively, and the respective divided sections as being the marks for the integers (Nj) are indicated, respectively.

Here, the aforesaid indications include an electric light indication and a printed character. Furthermore, the marks include a sign such as [*], character, pattern or a combination therebetween.

DETAILED DESCRIPTION OF THE PREFERRED EMBODIMENT

Description will hereunder be given of one embodiment of the present invention with reference to the drawings.

Figure 1:
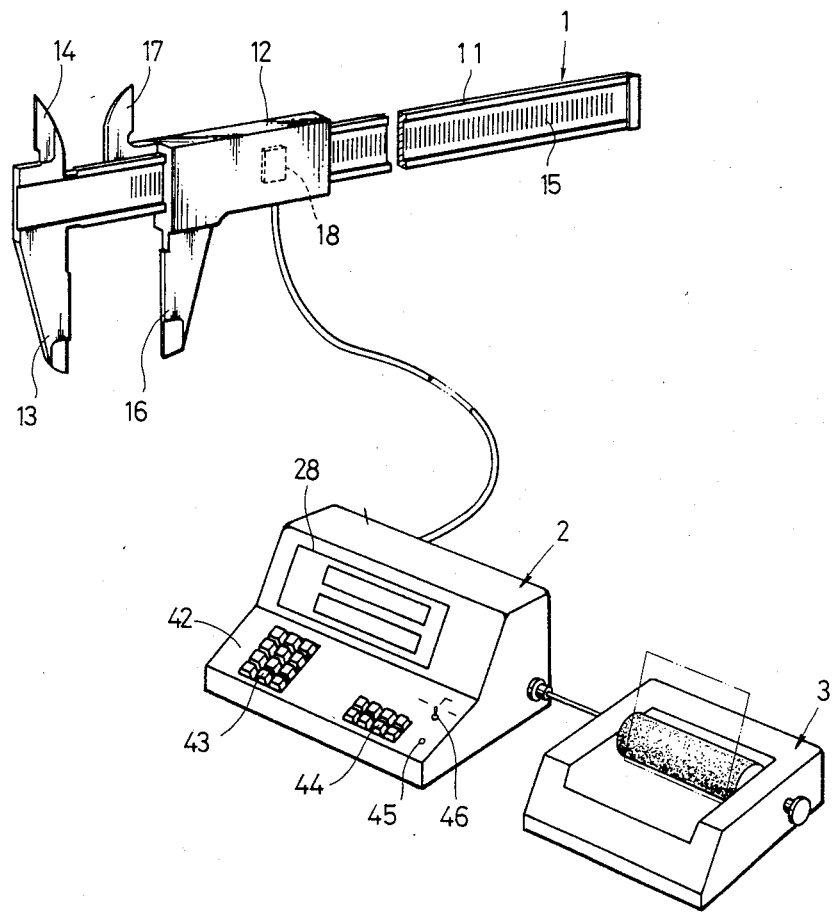
FIG. 1 is a perspective view generally showing the measuring system, in which the method according to the present invention is worked.

FIG. 1 generally shows the digital indication type displacement measuring system. This measuring system comprises slide calipers 1, a data processing unit 2 and a printer 3.

The slide calipers 1 is slidably provided thereon with a slider 12 movable on and in the longitudinal direction of a main scale 11. The main scale 11 has integrally formed on the lower edge of one end thereof a jaw 13 for engaging the outer sides of a workpiece and on the upper edge of the aforesaid one end thereof a jaw 14 for engaging the inner sides of the workpiece. Further, the main scale 11 is provided on the outer surface thereof and extending in the longitudinal direction thereof with a magnetic scale 15 magnetized at regular pitches. The slider 12 has integrally formed on the lower edge of one end thereof a jaw 16 for clamping or engaging the outer side of the workpiece in cooperation with the jaw 13 to facilitate a measuring of the outer sides and, similarly, on the upper edge of the one end thereof a jaw 17 for being brought into contact with the inner sides of the workpiece along with the jaw 14 to facilitate measuring the inner sides. Further, the slider 12 has on the inner surface thereof, opposed to the outer surface of the main scale 11 with, a detection head 18 for detecting a magnetic variation of the magnetic scale 15 and producing an electric signal. With the above arrangement, when the slider 12 is moved in accordance with the workpiece in the longitudinal direction of the main scale 11, a sinusoidal wave signal corresponding to a magnetic variation in the magnetic scale 15 is transmitted from the detection head 18 to the data processing unit 2.

Figure 2:
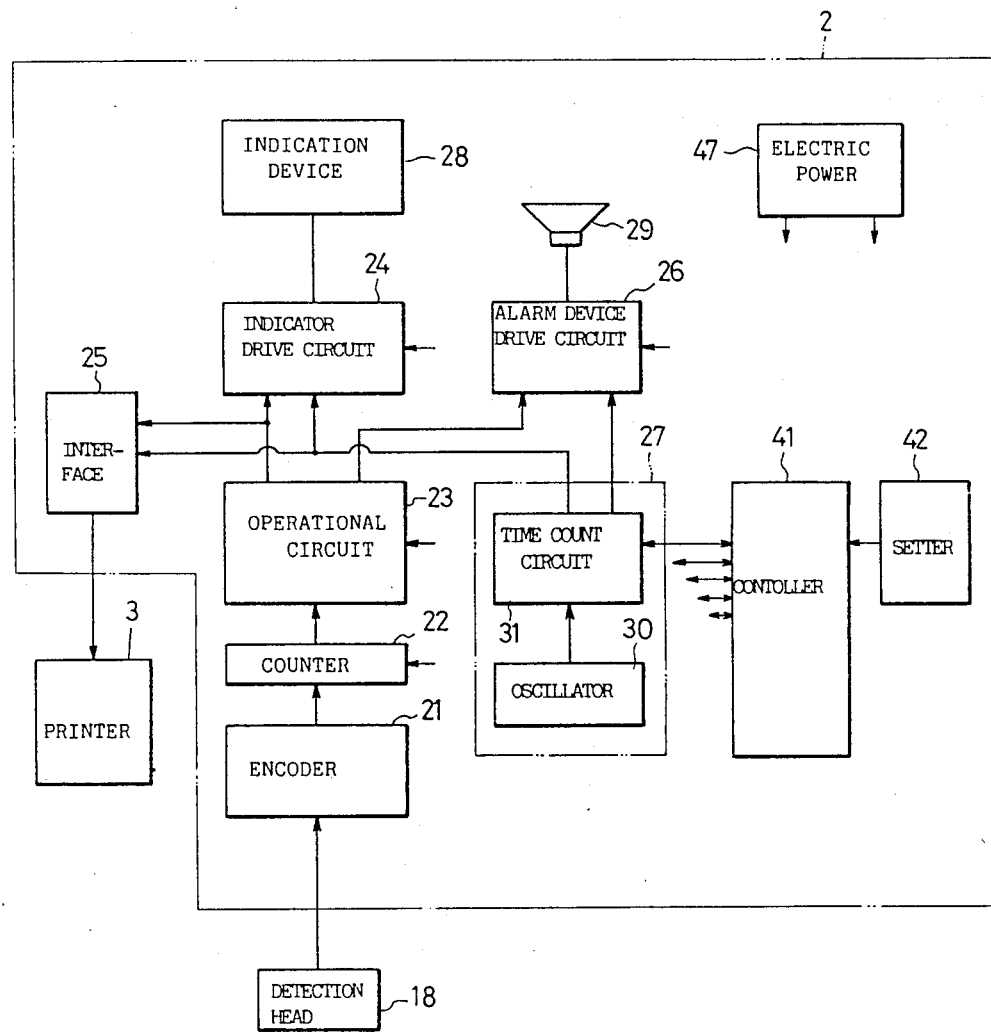
FIG. 2 is a block diagram showing the circuit arrangement of the data processing unit.
Figure 3:
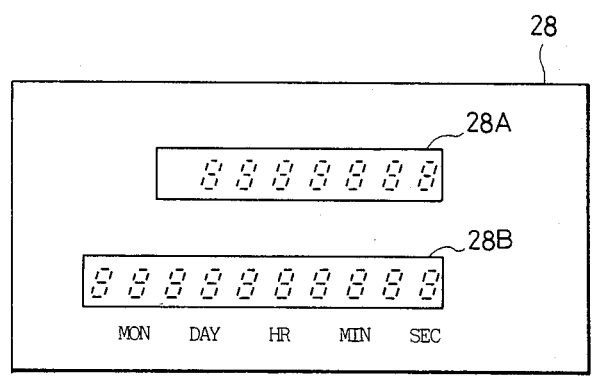
FIG. 3 is a front view showing the indication device.

As shown in FIG. 2, the data processing unit 2 is provided thereon with an encoder 21 for waveform-shaping an output signal from the detection head 18 and converting the same into a pulse signal. The output from the encoder 21 is counted by a counter 22, and thereafter, transmitted to an operational circuit 23. A number counted by the counter 22 is selectively cleared by a reset signal from a controller 41. Furthermore, the operational circuit 23 calculates an output from the counter 22 in response to a command from the controller 41, transmits the result of calculation to an indicator drive circuit 24 and the printer 3 via an interface 25, respectively, and transmits an alarm signal to an alarm device drive circuit 26 when the result of the calculation exceeds a preset allowable dimension for the workpiece. The indicator drive circuit 24 digitally indicates in an indication device 28 the data from the operational circuit 23 and time data from a clock circuit 27 in response to commands from the controller 41, respectively. As shown in FIG. 3, the indication device 28 is integrally provided therein with a measured value indicator 28A for digitally indicating the measured value data from the operational circuit 23 and a time indicator 28B for digitally indicating the time data from the clock circuit 27. Furthermore, the interface 25 transmits to the printer 3 the time data from the clock circuit 27 in addition to the various data from the operational circuit 23. Further, the alarm device drive circuit 26 operates an alarm device 29 in response to alarm signals from the operational circuit 23 and the clock circuit 27, whereby a worker is informed of the condition by sounds. The clock circuit 27 comprises an oscillator 30 for emitting clock pulses and a time count circuit 31 for counting clock pulses from the oscillator 30 and emitting signals, corresponding to month, day, hour, minute and second in accordance with the counted numbers, to the indicator drive circuit 24 and the interface 25, in response to a command from the controller 41.

Figure 4:
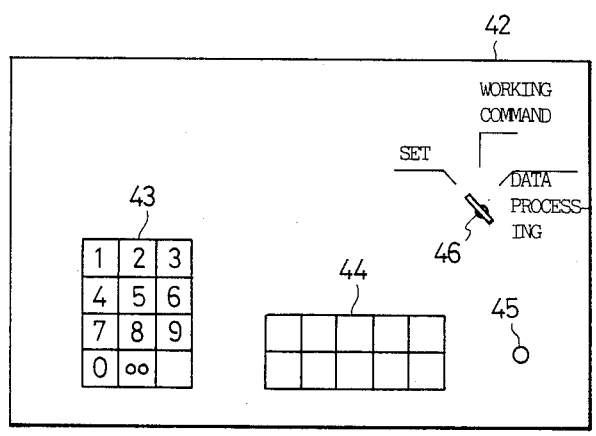
FIG. 4 is a front view showing the setter.

On the other hand, the controller 41 is provided therein with respective storing portions for storing programs and various data for controlling the counter 22, the operational circuit 23, the indicator drive circuit 24, the alarm device drive circuit 26 and the time count circuit 31 in accordance with preselected modes, and connected thereto with a setter 42 from outside. As shown in FIG. 4, the setter 42 is provided with a data output button 45 and a mode changeover switch 46 in addition to a ten key 43 and a function key 44 for storing in the storing portions of the controller 41 the upper limit value (Max) and the lower limit value (Min) of the allowable dimension for the workpiece, the divisor (Nd) for evenly dividing the range of the allowable dimension, the sampling number (N), the weight coefficients (C), a sampling time interval (T) and the like. Here, when the data output button 45 is operated, the measured value data and the data from the time count circuit 31, both of which are digitally indicated in the indication device 28, are to be printed out in the printer 3 via the interface 25. Furthermore, when any mode out of a setting mode, a working command mode and a data processing mode is specified by the mode changeover switch 46, the controller 41 carries out a program corresponding to the mode thus specified by the mode changeover switch 46. In addition, designated at 47 in the drawing is a power source for operating the circuits in the data processing unit 2, and in this embodiment, a battery is used as the power source.

Description will hereunder be given of the operation of this embodiment.

Firstly, after the mode changeover switch 46 of the setter 42 is switched to the setting mode, when the upper limit value (Max) and the lower limit value (Min) of the allowable dimension for the workpiece, the divisor (Nd) for evenly dividing the range of the allowable dimension, the sampling number (N), the weight coefficients (C) comprising a plurality of integers and the sampling time interval (T) are inputted by the ten key 43 and the function key 44, these data are stored in the storing portions of the controller 41. Here, the weight coefficients (C) are of six types including 1, 2, 5, 10, 20 and 50.

Figure 5:
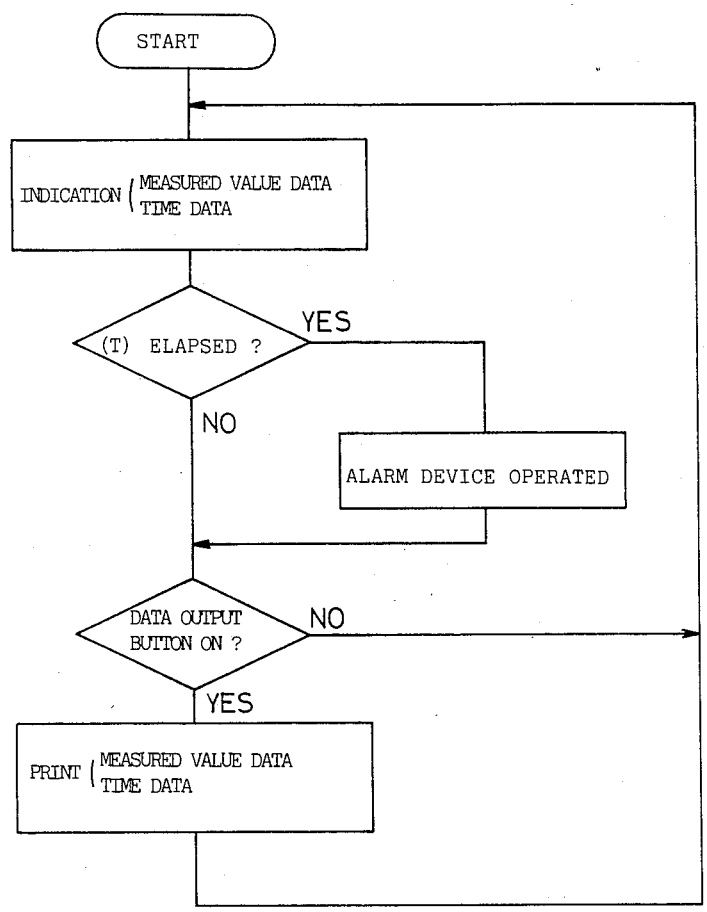
FIGS. 5 and 6 are flow charts.

Now, after the completion of this setting operation, if the mode changeover switch 46 on the setter 42 is changed to a working command mode to facilitate a measurement, then, as shown in FIG. 5, the measured value data from the operational circuit 23, i.e., the distance between the jaws 13 and 16 for measuring the outer sides of a workpiece or the distance between the jaws 14 and 17 for measuring the inner sides of a workpiece is indicated in the measured value indicator 28A of the indication device 28 via the indicator drive circuit 24, and the time data from the time count circuit 31 is indicated in the time indicator 28B of the indication device 28 via the indicator drive circuit 24, respectively. Here, after a lapse of the sampling time interval (T) set in the storing portion of the controller 41 upon the input of the time data from the time count circuit 31, an alarm signal is transmitted from the time count circuit 31 to the alarm device drive circuit 26. Thereupon, the alarm device drive circuit 26 operates the alarm device 29 to inform the worker of the time for conducting the measurement, whereby the worker carries out the measuring of the workpiece by use of the slide calipers 1.

Now, if the slider 12 of the slider calipers 1 is caused to slide on the main scale 11, then a sinusoidal wave signal corresponding to a magnetic variation in the magnetic scale 15 is transmitted from the detection head 18 to the encoder 21. The signal transmitted to the encoder 21 is waveform shaped, and thereafter, converted into pulse signals. After counted by the counter 22, the pulse signals are transmitted to the operational circuit 23. Then, in the operational circuit 23, the dimension corresponding to the distance between the jaws 13 and 16 for measuring the outer sides of a workpiece or the distance between the jaws 14 and 17 for measuring the inner sides of a workpiece is calculated from the counted number of the counter 22, and the measured value data thereof are successively indicated in the measured value indicator 28A of the indication device 28 via the indicator drive circuit 24. Here, in the state where the jaws 13 and 16 for measuring the outer sides are in contact with the outer sides of the workpiece or the jaws 14 and 17 for measuring the inner sides are in contact with the inner sides of the workpiece, if the data output button 45 of the setter 42 is operated, then the measured value data from the operational circuit 23 and the time data from the time count circuit 31 are transmitted to the printer 3 via the interface 25, and printed out through the operation of the printer 3. In consequence, only a glance cast at the data printed out by the printer 3 makes it possible to learn both the measured value data and the time data.

Figure 6:
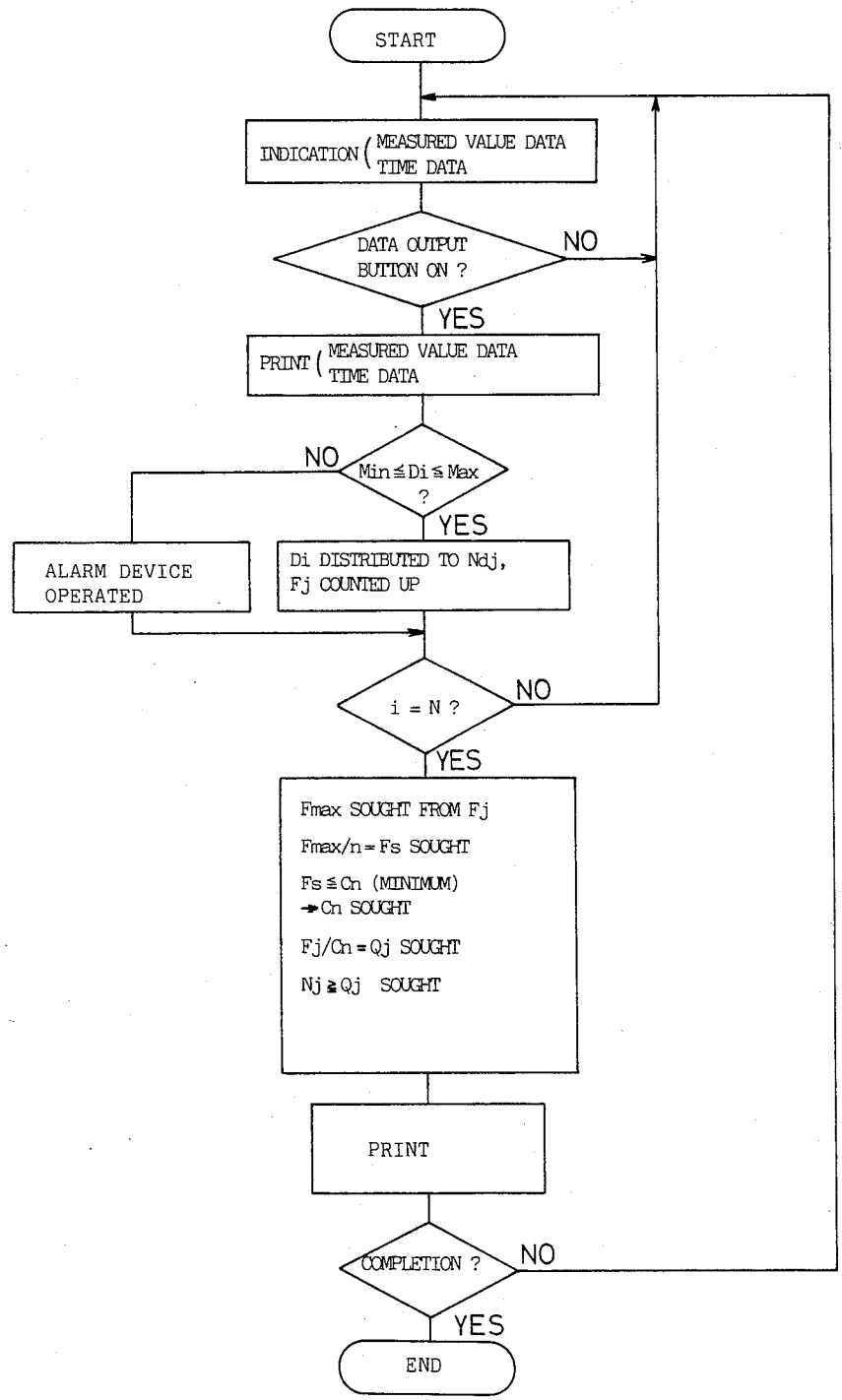

On the other hand, to carry out a sampling inspection of a group of workpieces, the mode changeover switch 46 of the setter 42 is switched to the data processing mode. Then, as shown in FIG. 6, the measured value data from the operational circuit 23 is indicated in the measured value indicator 28A of the indication device 28 via the indicator drive circuit 24 and the time data from the time count circuit 31 is indicated in the time indicator 28B of the indication device 28 via the indicator drive circuit 24. Here, the jaws 13 and 16 for measuring the outer sides or the jaws 14 and 16 for measuring the inner sides are brought into contact with portions of the workpiece for measuring a workpiece selected from a group of the workpieces, and thereafter, the data output button 45 of the setter 42 is operated. Then, the measured value data from the operational circuit 23 and the time data from the time count circuit 31 are printed out by the printer 3 via the interface 25, and thereafter, in the operational circuit 23, it is judged whether or not the measured value data (Di) is included within the range of the upper limit value (Max) and the lower limit value (Min) stored in the storing portion of the controller 41, i.e., the range of the allowable dimension. Here, when it is judged that the measured value data (Di) is not included within the range of the allowable dimension, an alarm signal is transmitted from the operational circuit 23 to the alarm device drive circuit 26, and the alarm device 29 is operated for a predetermined period of time. In consequence, the worker is informed of that the workpiece exceeds the range of the allowable dimension. On the other hand, when it is judged that the measured value data (Di) is included within the range of the allowable dimension, it is judged which divided section (Ndj) of the allowable dimension evenly divided by the divisor (Nd) set in the storing portion of the controller 41 each of the measured value data (Di) belongs to, the frequencies (Fj) corresponding to the divided sections (Ndj), to which the measured value data (Di) belong, are counted up, and thereafter, it is judged whether or not the number (i) of the measured value data (Di) reaches the sampling number.

Figure 7:
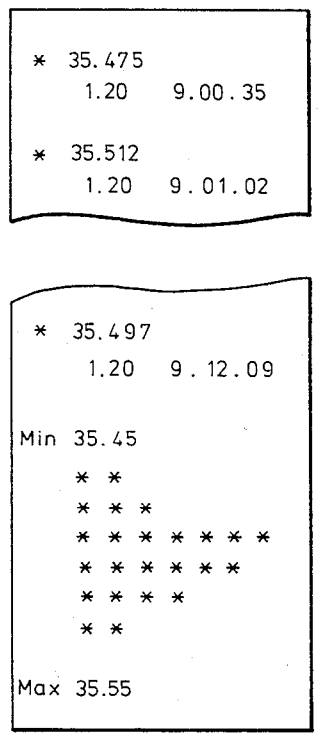
FIG. 7 is a view showing the sample of printed characters.

As described above, a plurality of workpieces are successively measured, and, when the number (i) of the measured value data (Di) reaches the sampling number, the maximum frequency (Fmax) out of the frequencies (Fj) is sought in the operational circuit 23. Thereafter, this maximum frequency (Fmax) is divided by the number of printable character places (n) of the printer 3 and a quotient (Fs) is extracted. Here, the minimum weight coefficient (Cn), which is larger in value than the aforesaid quotient (Fs), is selected out of the weight coefficients (C) set in the storing portion of the controller 41, thereafter, the aforesaid respective frequencies (Fj) are divided by the selected weight coefficient (Cn) and quotients (Qj) are extracted, respectively, and further, the minimum integer (N) which is larger in value than the above quotients (Qj) is determined. Thereafter, the integers (Nj) for the respective divided sections (Ndj), which are obtained through the above calculation, are printed out in the printer 3 as the marks corresponding in number to the integers (Nj), e.g., [*]. In this case, as shown in FIG. 7 for example, the upper limit value (Max) and the lower limit value (Min) set in the storing portion of the controller 41 are printed out along with the marks. In consequence, the variability of the workpieces can be known at a glance from the data printed out by the printer 3.

Now, if it is supposed that the maximum frequency (Fmax) is 130 and the number of printer places is 7, then the aforesaid quotient (Fs) becomes 18.57... Hence, the minimum weight coefficient larger in value than this is determined to be 20. Then, if the maximum frequency 130 is divided by this weight coefficient 20, then the quotient (Qj) becomes 6.5 and the minimum integer (Nj) is determined to be 7. Then, seven marks of [*] corresponding to this integer are printed out. In short, a histogram may be indicated in which the amplitudes of the maximum frequencies (Fmax) are represented by the numbers of the maximum indication places of the printer.

In consequence, according to this embodiment, in the state where the mode changeover switch 46 is switched to the working command mode, both the measured value data from the operational circuit 23 and the time data from the time count circuit 31 are digitally indicated in the indication device 28 and, after a lapse of a preset sampling time interval (T) upon the output of the time data from the time count circuit 31, the alarm device 29 is operated, so that, in the mass production of high precision parts for example, even when the changes in the machine tools and the like are brought into consideration and sampling measurements are successively made at a predetermined time interval, the time for the sampling measurement can be visually and audibly known, thus enabling to make the measurement with high accuracy. Furthermore, in the state where the jaws 13 and 16 for measuring the outer sides or the jaws 14 and 17 for measuring the inner sides are brought into contact with the workpiece, when the data output button 45 is operated, both the measured value data from the operational circuit 23 and the time data from the time count circuit 31 are printed out by the printer 3, so that, even if the number of the measurements and quantity of the workpieces per unit time are large, an accurate time and measured result per workpiece can be recorded. Further, in the digital indication type measuring instrument, there are provided electronic circuits such as a circuit for dividing the pulse outputted by the encorder, the counter and the like in general, so that only the addition of some electronic parts suffices without requiring a change in the system as a whole to a considerable extent.

On the other hand, in the state where the mode changeover switch 46 is switched to the data processing mode, it is judged which divided section (Ndj) of the allowable dimension evenly divided by the divisor (Nd) the measured value data, which is taken in each time the data output button 45 is operated, belongs to, the frequencies (Fj) of the measured value data belonging to the respective divided sections are counted up, after the number (i) of the measured value data (Di) reaches the sampling number (N), a predetermined calculation is performed so that these data can be received in the printable places (n) of the printer 3, and these data are printed out as the marks corresponding in number to the frequencies thereof. Hence, the distribution in accuracy of the measured value data of a group of workpieces and the variability thereof can be judged at a glance, so that the measurement can be omitted from a predetermined number of products, the sampling number can be decreased, or the data can be utilized as the data for the adjustment to be made on the producing machines. Moreover, the above-described facts are advantageous in that no high judging power is required of the worker. Furthermore, it is judged whether or not the measured value data are within the range of the allowable dimension and, when the measured value data exceeds the range of the allowable dimension, the alarm device 29 is operated, so that conforming workpieces can be readily discriminated from non-conforming ones.

In addition to the above, the battery type electric power is used for the data processing unit 2, whereby the measuring instrument is portable, so that the measurement can be carried out at various job sites.

In the above embodiment, there has been shown the case where the slide calipers 1 is used as the measuring instrument, however, instead of the slide calipers, measuring instruments such as a micrometer, a dial gauge, a height gauge and the like can be used and signals from these measuring instruments can be inputted to the data processing unit 2. In passing, movement values of spindles in the micrometer, dial gauge and the like and movement values of sliders in the height gauge and the like are detected as electric signals, respectively, and may be inputted to the encoder 21.

Furthermore, except the magnetic scale type detecting means described in the above embodiment, as the means for detecting the aforesaid movement values, there may be adopted a photoelectric type detecting means, in which a main scale is provided on one side of a relatively movable member and an index scale is provided on the other side of the relatively movable member for example, whereby the light transmitting through both scales is electrically detected. In addition, there may be applicable detecting means of various types including an electric capacity type, a contact type, a resistor type, a laser type and the like.

In the alarm device drive circuit 26, if the prewarning command alarm of the sampling measuring time transmitted from the time count circuit 31 and the unallowable dimension alarm from the operational circuit 23 are discriminated and varied in tone, sound pressure or length of sound, then a variation makes it possible for the worker to readily discriminate the type of alarm.

In the above embodiment, on condition that the data output button 45 has been operated, the measured value data from the operational circuit 23 and the time data from the time count circuit 31 are printed out by the printer 3 and the classified indication process of the measured value data is carried out. However, such an arrangement may be adopted that, in the slide calipers and the micrometer, a piezo-electric element is provided either one of the contact members to be brought into contact with the workpiece, and, in response to a signal detected when a predetermined value of measuring force is applied to this piezo-electric element, the respective data are printed out and subjected to the classified indication process. In this case, in the height gauge and the like, it is preferable to use a touch signal probe rather than the piezo-electric element. Further, as the means for outputting the respective data, a cathode ray tube, a recorder and the like may be used except the printer 3.

In the above embodiment, the working command mode and the data processing mode has been switched to each other by the mode changeover switch 46, however, if the both modes are combined together, the measured value data inputted at every sampling time interval (T) are processed in the same manner as in the process of the data processing mode, and, when the number (i) of the measured value data reaches the sampling number (N), the marks for the respective divided sections are indicated histogrammatically, then the variability of the data within a predetermined period of time can be judged at a glance. In this case, in processing a group of measured value data, the provision of functions of calculating the mean value and the standard deviation makes it possible to seek the mean value and the standard deviation within a predetermined period of time, so that the degree of wear, etc., of working tolls such as a bite can be controlled.

In the above embodiment, the range of the allowable dimension of the workpiece has been evenly divided by the divisor (N) and, only on divided sections (Ndj), the marks have been indicated histogrammatically. However, the range of division need not necessarily be limited to the allowable dimension, and, if the range of dimension, within which all the data are included in consideration of the variability of a group of measured value data, and the set range is evenly divided, then a histogram for studying the group of measured value data as a whole can be obtained. In addition to the above, separately of the divided sections of the allowable dimension, a divided section larger than the upper limit value (Max) of the allowable dimension and a divided section smaller than the lower limit value (Min) may be provided, respectively, a histogrammatic indication process may be carried out by use of the marks, including the above-described the additional divided section from the upper limit value and the additional divided section from the lower limit value.

In addition in the above embodiment, the sampling number has been present and, when this sampling number is reached a group of measured value data have been indicated, however, the present invention need not necessarily be limited to this, but, by a command of the worker, the indication of the measured value data can be made by use of the desired sampling number in the same manner as in the above embodiment.

Further, as the marks used, in addition to the [*] described in the above embodiment, characters, patterns or combination therebetween are adoptable. Furthermore, as the indication of the time data, in addition to month, day, minute and second, year, day of week, etc. may be additionally indicated.

As has been described hereinabove, the present invention can provide a method of indicating a group of measured value data of a measuring instrument histogrammatically and qualitatively.

What is claimed is:

1. In a method for indicating a group of measured values of a measuring instrument, wherein a ncasuring element is brought into contact with a workpiece to be measured, a displacement value of the measuring element is converted into an electric signal by an encoder connected to the measuring element and a measured value based on said electric signal is indicated in an output device having a predetermined number of indication places, the improvement comprising wherein:

setting an upper limit value (Max) and a lower limit value (Min) of a set dimension based on a reference value of said workpiece, a divisor (Nd) evenly dividing a range of the set dimension and weight coefficients (C) comprising a plurality of integers into a program store;

thereafter, each time that measured value data (Di) detected when said measuring element comes into contact with said workpiece is obtained, judging it to decide which divided section of the set dimension evenly divided by the divisor (Nd) each of the measured value data (Di) belongs to, storing the frequencies of measurement (Fj) of the measured value data (Di) belonging to each of the divided sections, after a number (i) of the measured value data (Di) reaches an optional sampling number (N), the maximum measurement frequency (Fmax) out of the frequencies of measurement (Fj) is determined, dividing said maximum measurement frequency (Fmax) by the number of indication places (n) to obtain a quotient (Fs);

selecting a minimum weight coefficient (Cn) out of said weight coefficients (C) which are larger in value than said quotient (Fs); and dividing the frequencies of measurement (Fj) by the weight coefficient (Cn) thus selected to obtain a quotient (Qj), thereafter determining minimum integers (Nj) which are larger in value than the quotient (Qj) and indicating said divided sections as marks representing said integers (Nj).

2. The method of indicating measured values of a measuring instrument as set forth in claim 1, wherein said weight coefficients (C) are of six values including 1, 2, 5, 10, 20 and 50.

3. The method of indicating measured values of a measuring instrument as set forth in claim 1, wherein said marks are indicated by at least one of signs, characters, patterns and combinations thereof.

4. The method of indicating measured values of a measuring instrument as set forth in claim 1, wherein said marks are indicated by printing.

5. The method of indicating measured values of a measuring instrument as set forth in claim 1, wherein said marks are indicated by electric lights.

6. The method of indicating measured values of a measuring instrument as set forth in claim 1, wherein an alarm is transmitted when said measured value data (Di) exceeds the set dimension.

7. In a method for indicating a group of measured values of a measuring instrument, wherein a measuring element is brought into contact with a workpiece to be measured, a displacement value of the measuring element is converted into an electric signal by an encoder connected to the measuring element and a measured value based on said electric signal is indicated in an output device having a predetermined number of indication places (n), the improvement comprising wherein:

setting an upper limit value (Max) and a lower limit value (Min) of a set dimension based on a reference value of said workpiece, a divisor (Nd) evenly dividing a range of the set dimension, a sampling number (N) and weight coefficients (C) comprising a plurality of integers into a program store;

thereafter, each time that measured value data (Di) detected when said measuring element comes into contact with said workpiece is obtained, judging it to decide which divided section of the set dimension evenly divided by the divisor (Nd) each of the measured value data (Di) belongs to, storing the frequencies of measurement (Fj) of the measured value data (Di) belonging to each of the divided sections, after a number (i) of the measured value data (Di) reaches the sampling number (N), the maximum measurement frequency (Fmax) out of the frequencies of measurement (Fj) is determined, dividing said maximum measurement frequency (Fmax) by the number of indication places (n) to obtain a quotient (Fs);

selecting a minimum weight coefficient (Cn) out of said weight coefficients (C) which are larger in value than said quotient (Fs); and dividing the frequencies of measurement (Fj) by the weight coefficient (Cn) thus selected to obtain of quotient (Qj), thereafter determining minimum integers (Nj) which are larger in value than the quotient (Qj) and indicating said divided sections as being marks representing said integers (Nj).

8. In a method for indicating a group of measured values of a measuring instrument, wherein a measuring element is brought into contact with a workpiece to be measured, a displacement value of the measuring element is converted into an electric signal by an encoder connected to the measuring element and a measured value based on said electric signal is indicated in an output device having a predetermined number of indication places (n), the improvement comprising wherein:

setting an upper limit value (Max) and a lower limit value (Min) of a set dimension based on a reference value of said workpiece, a divisor (Nd) evenly dividing a range of the set dimension, a sampling number (N), a sampling time interval (T) and weight coefficient (C) comprising integers of six values including 1, 2, 5, 10, 20 and 50 into a program store;

thereafter, when a data processing mode is selected, indicating time data and measured value data (Di), which are obtained when said measuring element is brought into contact with the workpiece, judging it, each time said data are taken in, to decide whether or not said measured value data (Di) are within the range of the set dimension, indicating an alarm when said measured value data (Di) exceeds the set dimension, while, when said measured value data (Di) within the range of the set dimension, judging it to decide which divided division of the set dimension divided by the divisor (Nd) each of the measured value data (Di) belongs to, storing the frequencies of measurement (Fj) of the measured value data (Di) belonging to each of the divided sections, after a number (i) of the measured value data (Di) reaches the sampling number (N), the maximum measurement frequency (Fmax) out of the frequencies of measurement (Fj) is determined, dividing said maximum measurement frequency (Fmax) by the number of indication places to obtain a quotient (Fs);

selecting a minimum weight coefficient (Cn) out of said weight coefficients (C) which are larger in value than said quotient (Fs);

dividing the frequencies of measurement (Fj) by the weight coefficient (Cn) thus selected to obtain a quotient (Qj), and thereafter, determining minimum integers (Nj) which are larger in value than the quotient (Qj);

printing said divided sections as marks consisting of at least one of signs, characters, patterns and combinations thereof, representing said integers (Nj); and printing, when a working command mode is selected, the time data and the measured value data, which are obtained when said measuring element is brought into contact with the workpiece.

* * * * *